Figure 1:
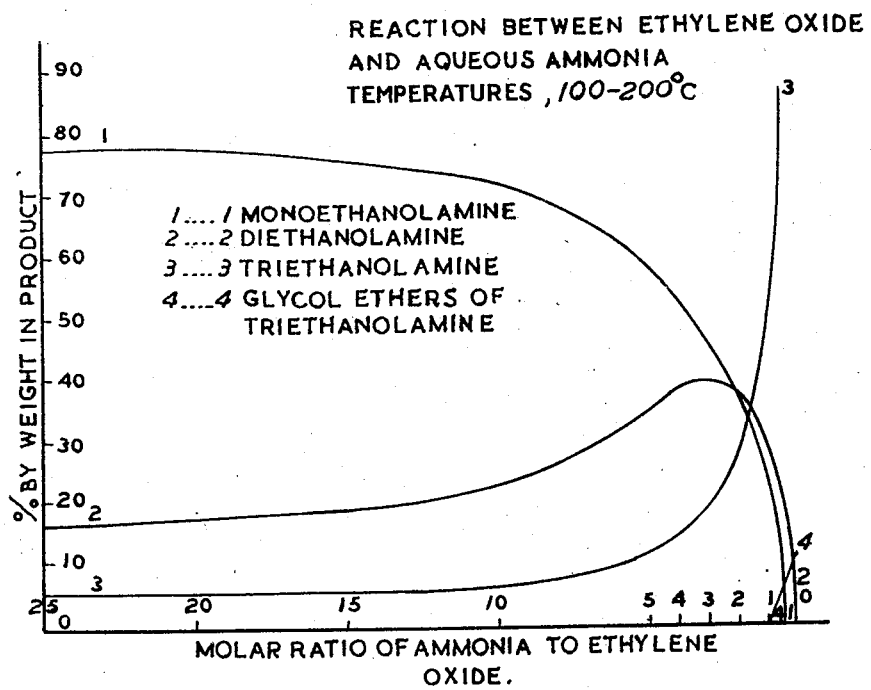

Feb. 11, 1958 A. J. LOWE ET AL 2,823,236
MANUFACTURE OF ALKANOLAMINES
Filed Aug. 27, 1952 2 Sheets-Sheet 1

Inventors
Arnold John Lowe
Donald Butler
Edwin Marshall Meade
By- Pollard & Johnston
Attorneys INVENTORS
Arnold John Lowe
Donald Butler
Edwin Marshall Meade
By- Pollard & Johnston
Attorneys

United States Patent Office 2,823,236
Patented Feb. 11, 1958

2,823,236

MANUFACTURE OF ALKANOLAMINES

Arnold John Lowe, Manchester, and Donald Butler, Moston, Manchester, England, and Edwin Marshall Meade, Nobleton, Ontario, Canada Application August 27, 1952, Serial No. 306,651

Claims priority, application Great Britain August 30, 1951

4 Claims. (Cl. 260—584)

This invention relates to the manufacture of alkanolamines.

The reaction of aqueous ammonia with ethylene oxide to produce a mixture of monoethanolamine, diethanolamine, and triethanolamine, was described by Wurtz in 1860 (Liebig's Annalen der Chemie, vol. 114, p. 51). This reaction, and the analogous one between aqueous ammonia and propylene oxide, has since then been widely described in the literature.

The reaction of ethylene oxide or propylene oxide with aqueous solutions of ammonia is an exceedingly rapid one, and is accompanied by the evolution of approximately 26,000 cals. of heat per gram.-mol. of ethylene oxide or propylene oxide reacted. In view of the danger of explosion inherent in this process it has hitherto been the general practice in industry to carry out the reaction at temperatures between 0° and 50° C. and to add the ethylene oxide or propylene oxide slowly over a period of hours to the aqueous ammonia contained within a large reaction vessel, so that the amount of unreacted alkylene oxide present at any time in the reaction system is limited to a minimum.

More recently there have been references to the use of higher temperatures in the carrying out of such reactions. Thus Kedrinskii and K. H. Plaska in an article in Novosti Neftepererabatki 1936, 3, No. 4, 6 (which is summarised in Chemical Abstracts of the American Chemical Society, vol. 30, p. 6706, 1936) described experiments in which ethylene oxide and ammonia were fed in stoichiometric quantities into a solvent medium at 60° C. The resulting product consisted of 1.5% diethanolamine, 75% triethanolamine, 13% polymerised material and nearly 10% water. The yield based on ethylene oxide was only 89% of theory.

Further, Schwoegler et al. in U. S. Patent No. 2,373,199 propose the production of alkanolamines by the continuous reaction of ammonia with an alkylene oxide under substantially anhydrous conditions at a temperature between 120 and 275° C.

Our investigation of the reaction of ammonia and ethylene oxide has shown that the reaction does not proceed to any appreciable extent in the absence of hydroxy bodies. Further, we have found that even with traces of water present at temperatures of 120° C. and above, the reaction proceeds so slowly that it does not provide a satisfactory continuous process for use on an industrial scale.

Apart from the limitations imposed by the size of the reactor, prolonged reaction at high temperatures is liable to result in contamination and degradation of the products.

It is an object of the invention to provide a continuous process for the production of alkanolamines by the reaction of ammonia with an alkylene oxide having 2 or 3 carbon atoms in the molecule in which complete reaction of the alkylene oxide takes place within a relatively short time. It is further an object of the invention to provide a process for the production of alkanolamines which is flexible in that it can be varied to produce mono-, di-, or tri-alkanolamine as the main product.

In accordance with the present invention a process for the production of alkanolamines consists in continuously reacting ammonia with an alkylene oxide having 2 or 3 carbon atoms in the molecule by continuously passing a mixture of the alkylene oxide, ammonia and an hydroxy compound selected from water and organic hydroxy compounds containing one or more alcoholic or phenolic hydroxy groups, which mixture contains not more than 50% by weight of alkylene oxide, at least 1% by weight of water or an equivalent amount of hydroxy compound in terms of hydroxy group content, and at least one molecule of ammonia for every three molecules of alkylene oxide present, under a pressure which maintains the mixture in the liquid state through a reaction zone heated to at least 80° C. and maintained with the temperature range of 80 to 300° C., the contact time within the reaction zone being such that substantially complete reaction of the alkylene oxide takes place. It may be found necessary, and it is preferable, to apply cooling to the reaction zone to remove the heat of reaction and to ensure that the temperature of the reaction mixture does not rise above 300° C. and preferably does not rise above 275° C. The cooling may be applied in the manner described below.

The process of the invention may most suitably be carried out by reacting an aqueous ammonia containing from 2 to 95% and preferably from 5 to 90% by weight of water with the alkylene oxide. Furthermore, the quantity of alkylene oxide in the reaction mixture is preferably not in excess of 35% by weight.

The contact time within the reaction zone depends primarily on the amount of water or other hydroxy compound present and on the temperature to which the reaction zone is heated. Thus it has been found that using an aqueous ammonia containing 2% by weight of water and heating the reaction zone to 100° C., a contact time of about 2 hours is necessary to ensure complete reaction of the alkylene oxide. Using the same temperature, the contact time may be decreased as the amount of water present is increased. Thus with 10% by weight of water and heating the reaction zone to 100° C., the contact time necessary for complete reaction is decreased to 30 minutes. By further increasing the proportion of water present the contact time may be reduced still further. Increasing the temperature to which the reaction zone is heated also results in a decrease of the contact time necessary to ensure complete reaction of the alkylene oxide.

Thus by suitable choice of the amount of water or other hydroxy compound present in the reaction mixture and of the temperature, it is possible to operate the process of the invention with very short contact times. For example, in one form of the invention utilising an aqueous ammonia containing from 10 to 35% by weight of ammonia in a reaction mixture containing not more than 35% by weight of alkylene oxide and heating the reaction zone to 100° C., contact times of between 30 and 120 seconds may be employed. In another and the preferred form of the invention using a strong aqueous ammonia solution containing from 40 to 80% by weight of ammonia in a reaction mixture containing not more than 35% by weight of alkylene oxide, heating the reaction zone to 100 to 150° C. will enable a contact time of 120 seconds or less to be used.

The temperature to which the reaction zone is initially heated is preferably in the region of 100° C. when aqueous solutions of ammonia containing not more than 35% by weight of ammonia are used, and is preferably from 100 to 150° C. for stronger aqueous solutions of ammonia, temperatures of 120° C. and above being preferably used for aqueous solutions of ammonia containing about 80% or more by weight of ammonia.

As previously stated, it is generally necessary, and it is indeed preferable, to cool the reaction mixture to remove heat evolved in the highly exothermic reaction which takes place. Cooling is also preferable to ensure that after the initial, rapid rise in temperature within the reaction zone, the temperature is rapidly reduced to a point preferably below 150° C.

The short contact times involved in the process of the invention enable one to use a compact, strongly constructed reactor in the form of a coil having a relatively high surface to volume ratio which facilitates the rapid heating of the reaction mixture and also enables the heat of reaction to be removed rapidly from the reaction mixture. Both the heating and the removal of heat may satisfactorily be carried out by immersing the reactor in a bath of boiling liquid boiling at a temperature corresponding to the initial temperature to which the reactants are heated, the vapour from the boiling liquid being passed to a condenser in which it is cooled and condensed and the condensed liquid being returned to the bath. By this means any excessive rise of the temperature within the reactor may be prevented and the reactants, after an initial and rapid rise in temperature may be rapidly cooled down to a temperature of 150° C. and below.

The amount of heat which is evolved in the process of the invention is limited by the stipulation that the alkylene oxide must not constitute more than 50% by weight of the material fed to the reactor. Thus, the maximum temperature to which the reactants will rise under adiabatic conditions can be calculated fairly accurately on the assumption that the specific heat of the reactants is 1 calorie per gm. per ° C. and on the basis that the reaction of 1 gm. mol of ethylene oxide with ammonia evolves 26,000 cals. of heat. Thus, if $a$ gms. of ethylene oxide are reacted with $b$ gms. of ammonia in solution with $c$ gms. of water, the temperature rise (adiabatic) is $$\frac{a \times 2600}{(a+b+c) \times 44} °C.$$

As it is stipulated that $a$ must not be greater than $b+c$, the maximum temperature rise is under 300° C. With propylene oxide, the maximum temperature rise is still smaller.

Using a coiled reactor formed of 75 ft. of stainless steel tube of 0.154" internal diameter and 0.25" external diameter immersed in a bath of boiling water, it has been found that on passing a reaction mixture of a 35% by weight aqueous solution of ammonia and ethylene oxide, containing 50% by weight of ethylene oxide through the reactor, the temperature of the reaction mixture within the reactor may rise to approximately 200° C. but will then be rapidly reduced. The rise in temperature within the reaction zone due to the heat of reaction, is, providing it is not excessive or prolonged, not disadvantageous as it increases the rate of the reaction and also in the reaction with ethylene oxide, leads more rapidly to the decomposition of any quaternary ammonium hydroxide which may be formed. The effect of the latter is dealt with more fully below.

The invention has important advantages for the production of mono-alkanolamines in that by its means a crude product containing a relatively large proportion of alkanolamines, of which the major part is mono-alkanolamine, can be obtained.

Thus by reacting in accordance with the invention an aqueous ammonia containing 60% by weight of ammonia with ethylene oxide in the molecular ratio of ammonia to ethylene oxide of 7:1, using a reaction temperature of from 100–160° C., a pressure of 100 atmospheres and a contact time of 30 seconds, a crude product containing 23% by weight of ethanolamines, of which 60% by weight was monoethanolamine, was obtained. In the known process, the crude product normally contains about 9% by weight of ethanolamines, of which only 50% by weight is monoethanolamine.

On the other hand, despite the limitation on the proportion of alkylene oxide which may be present in the mixture of reactants in the process of the invention and the fact that the high temperatures employed favour the formation of the monoalkanolamine, the process is flexible in that the molar ratios of ammonia to alkylene oxide may be varied within the wide limits to vary the amounts of mono-, di-, and trialkanolamines in the product of the reaction. Furthermore, in accordance with the invention, the product of the process described above may be reacted with a further quantity of alkylene oxide under similar conditions to those described above to increase the production of trialkanolamines. By the use of two or more stages in this manner the use of a large quantity of water which has subsequently to be evaporated may be avoided.

The manner in which the composition of the product of the process of the invention varies with the molar ratio of ammonia to ethylene oxide in the reaction mixture is illustrated by the curves shown in Fig. 1 of the accompanying drawings. These curves were obtained by carrying out a number of experiments in which a 25% by weight aqueous ammonia solution and ethylene oxide were reacted in varying molar ratios of ammonia to ethylene oxide in the reactor coil described above. The coil was immersed in a bath of boiling water and the temperature in the coil was within the range 100 to 200° C. In each case the product was freed of excess ammonia and water and analysed. Curves 1, 2, 3, and 4 show respectively the percentages of monoethanolamine, diethanolamine, triethanolamine and glycol ethers of triethanolamine found in the product. Rather similar curves were obtained for the reaction of ammonia with propylene oxide. Further, it was found that the results do not vary appreciably with different strengths of the ammonia solution.

It can be seen from Fig. 1 that when monoethanolamine is the desired reaction product a molar ratio of ammonia to ethylene oxide between 4 to 1 and 10 to 1 is most suitable. The increase in the percentage of monoethanolamine in the product for ratios higher than 10 to 1 is so small that it will not generally be found advantageous to use higher ratios. When operating at these molar ratios for the production of monoethanolamine or monoisopropanolamine as the major product it is an advantage to use strong ammonia solutions since the amount of water to be subsequently removed is reduced.

In the production of diethanolamine it is seen that molar ratios between 1 to 1 and 4 to 1 are most satisfactory but that the percentage of diethanolamine in the reaction product after removal of ammonia and water, does not rise above about 40% by weight. The yield of diethanolamine can be increased by recovering the monoethanolamine in the reaction product and reacting this monoethanolamine in aqueous solution with ethylene oxide under similar conditions to those used for the reaction of ammonia with ethylene oxide in accordance with the invention.

For the production of triethanolamine a molar ratio of ammonia to ethylene oxide of 1 to 3 is theoretically required. Thus to preserve the limitation, imposed because of thermal considerations, that the ethylene oxide shall not be more than 50% by weight of the reaction mixture it is necessary in a single stage process to use a very dilute solution of ammonia, in which case the increased amount of water will function as a thermal diluent. The production of triethanolamine as the major product may, therefore, be effected in a single stage using a very dilute aqueous ammonia solution, e. g. a 10% by weight solution. The production of triethanolamine may, on the other hand, be carried out in two stages, using a 35% by weight aqueous ammonia solution. In the two stage process the 35% ammonia solution may be reacted with ethylene oxide in the molar ratio of ammonia to ethylene oxide of 1 to 1, and the product so formed cooled to ambient temperatures and then reacted in a similar manner with further ethylene oxide. We have found that an overall ammonia to ethylene oxide molar ratio of 1 to 2.5 produces an optimum product in either method. The two stage process may be varied by removing the unreacted ammonia from the product of the first stage before reacting it with a further quantity of ethylene oxide. If this is done the molar ratio of ammonia (contained in the product) to ethylene oxide (contained in the product and added) is preferably 1 to 2.8.

The production of triethanolamine by the process of the invention takes place with the formation of reduced amounts of the triethanolamine glycol ethers as by-products, compared with the amounts formed at lower temperatures. We have found that these ethers are formed by reaction between the triethanolamine present in the reaction mixture and ethylene oxide, according to the equation:

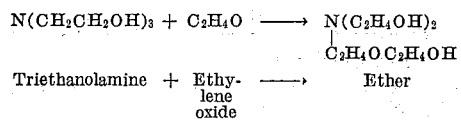

Triethanolamine + Ethylene oxide ⟶ Ether

At relatively low temperatures triethanolamine reacts with ethylene oxide to produce the quaternary ammonium hydroxide according to the equation:

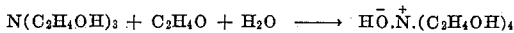

This hydroxide is a strong base and it is well known that alkalies catalyse the reaction of ethylene oxide with alcohols to form ethylene glycol ethers. It has been found that the rate of formation of these ethers is proportional to the amount of base present. At temperatures between 0° and 50° C. the quaternary ammonium hydroxide is stable but at higher temperatures and particularly above 100° C. this compound decomposes rapidly in the presence of water and ethanolamines to reform triethanolamines and ethylene oxide. Hence under the reaction conditions employed in the present process the concentration of the tetraethanolammonium hydroxide is reduced to small value and hence the formation of the by-product ethers is also reduced to a correspondingly small value.

Following on the above observations it has also been found that the addition of small amounts of acidic materials to the reaction mixture reduces the amounts of by-product ethers formed by neutralising any of the quaternary ammonium hydroxide present in the reaction mixture at the elevated temperatures employed. Examples of such acidic materials which may be added include boric acid, carbon dioxide, phosphoric acid and sulphuric acid.

The tri-isopropanolamine does not appear to form a quaternary ammonium hydroxide by reaction with propylene oxide, due no doubt to the steric factors involved, so that at all temperatures between 0° and 270° C. the reaction product is contaminated only with the triisopropanolamine glycol ethers, formed by the uncatalysed reaction between the tri-isopropanolamine and propylene oxide.

Even though the uncatalysed formation of these ethers is slightly greater in the present process than the amounts formed in previous processes employing lower temperatures, it is still very advantageous to carry out the reaction in the manner described from the point of view of safety and economy of operation.

Though the present invention is preferably carried out with water as the hydroxy compound component of the mixture of reactants, the water may be wholly or partially replaced by an organic hydroxy compound which contains one or more alcoholic or phenolic hydroxy groups. The organic hydroxy compounds which may be used are hydroxy derivatives of hydrocarbons which contain only carbon, hydrogen and one or more alcoholic or phenolic hydroxy groups. They should have a boiling point sufficiently distinct from that of the products to enable separation to take place without difficulty. The preferred organic hydroxy compounds are alkyl alcohols having a boiling point not above 150° C. and more preferably, not above 125° C., e. g. methanol and ethanol.

The amount of organic hydroxy compound present should be $$\frac{1 \text{ gram mol}}{\text{Number of hydroxy groups}}$$

for each gram mol of water that it replaces.

The beneficial effect of the presence of water or an organic hydroxy compound in the process of the invention is shown by our investigations in which we have found that the rate of reaction of ethylene oxide with ammonia is directly proportional to the product of the molar concentration of ammonia, the molar concentration of ethylene oxide, and the square of the concentration of hydroxy groups in gram equivalents per litre (i. e. total weight in grams of hydroxy groups per litre) present in the reaction system. This concentration of hydroxy groups is also given by the sum of the products obtained by multiplying the molar concentration by the number of hydroxy groups contained in the molecule for each hydroxy compound present.

In considering the reaction of ammonia with ethylene oxide when ammonia is present in considerable excess, e. g. 10 mols ammonia to 1 mol ethylene oxide, we find that if initially there are "$a$" mols/litre of ammonia, "$b$" mols/litre of ethylene oxide and "$c$" mols/litre of hydroxylic solvent ROH where "R" may be H, $CH_3$ etc. and if after a time "$t$" seconds "$x$" mols/litre of ethylene oxide have reacted to give $x$ mols of monoethanolamine, the reaction may be represented by the equation:

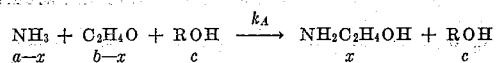

and that the reaction velocity may be expressed in the usual form:

$$dx/dt = k_A(a-x)(b-x)(c+x)^2$$

This equation assumes that the consequential reaction of monoethanolamine with ethylene oxide to form di-, and tri-ethanolamine is negligible in comparison with the reaction to produce monoethanolamine. This is so when "$a$" is large compared with "$b$." It can be seen from the equation for the reaction velocity that if ROH is absent, no reaction will take place.

Our measurements also show that the velocity constant of this reaction for 100° C., $k_A$, has the value of $5 \times 10^{-6} M^{-1} S^{-1}$. Substitution of this value in the equation for the reaction velocity and integration of the resulting equation leads to the following times for the reaction which we have calculated for the reaction of 4 molar equivalents of ammonia with 1 of ethylene oxide, the ammonia containing varying proportions of water, the reaction being carried out at 100° C.:

| Concentration of ammonia in water, percent by weight | Times of reaction of ethylene oxide | | |
|---|---|---|---|
| | 10%, secs. | 50%, secs. | 95%, secs. |
| 30 | 2 | 11 | 55 |
| 60 | 6 | 30 | 150 |
| 80 | 9 | 144 | 720 |
| 90 | 71 | 320 | 840 |
| 95 | 261 | 940 | 1,900 |
| 98 | 1,320 | 3,150 | 4,800 |
| 99 | 4,000 | 6,800 | 8,300 |
| 99.5 | 16,000 | 22,000 | 24,000 |

It is seen that with a decrease in the amount of water, there is a slower initial reaction followed by a subsequently more rapid reaction. This is to be expected as mono-ethanolamine which is formed, is itself a hydroxylic body.

In practice we found that it was impossible to control the temperatures of the reaction of 35% and 60% ammonia to get any figures other than for complete reaction. In the case of 80% and higher strength ammonia, we were able to control the reaction temperature at 100° C. and to obtain values for the times of reaction approximating to the calculated values given above. Even at 120° C. and higher temperatures we found no reaction between substantially anhydrous ethylene oxide and substantially anhydrous ammonia.

We have also found that there was a molar equivalence, in terms of the number of hydroxy groups contained in the molecule, between all hydroxylic solvents tested in their power to catalyse the reaction between ammonia and alkylene oxide.

Thus we have found that the presence in a unit volume of the reaction mixture of:

1 gram mol of water (18 grams)
1 gram mol of methanol (34 grams)
1 gram mol of phenol (94 grams)
½ gram mol of ethylene glycol (30.5 grams), or
⅓ gram mol of glycerol (30.7 grams)

has substantially the same effect on the reaction rate and time. The reaction velocity equation given above and the velocity constant cited, provide a method of calculating the reaction time and temperature, and thus of ensuring adequate control of the reaction and of avoiding the danger of explosion referred to by previous workers in this field.

One method of carrying out the process of the invention is described below with reference to Fig. 2 of the accompanying drawings, which illustrates diagrammatically a suitable apparatus for the carrying out of the invention.

Figure 2:
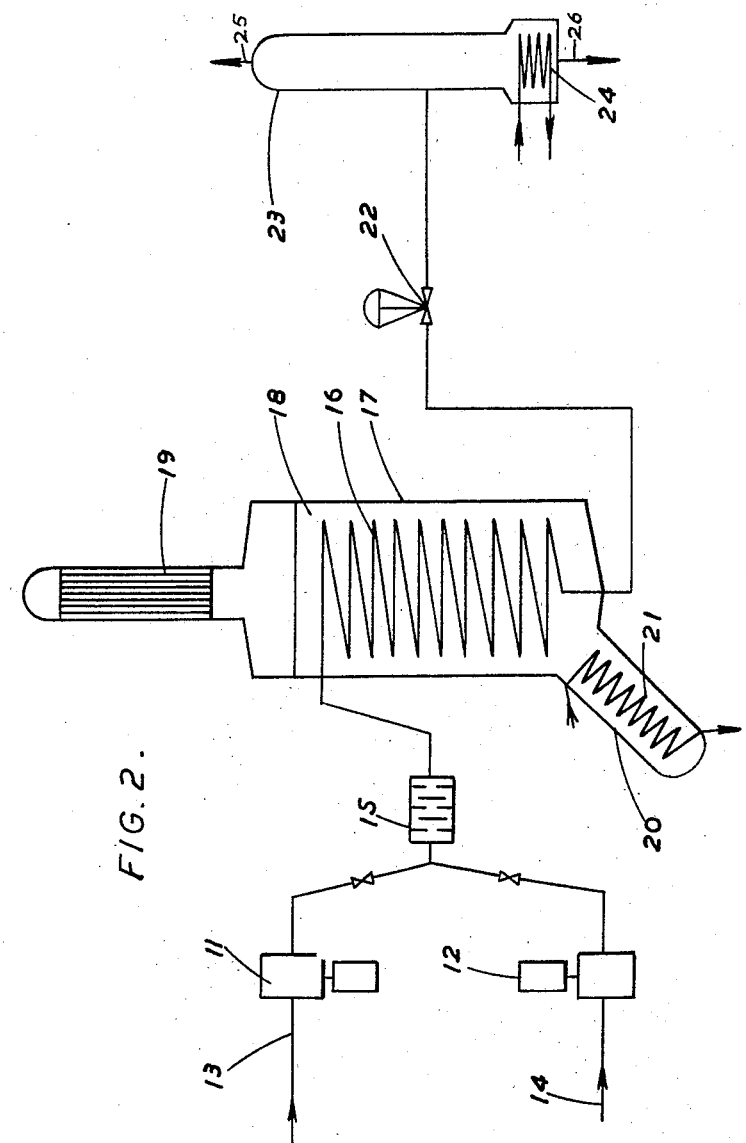

Referring to Fig. 2 an aqueous ammonia solution of the desired strength, and the alkylene oxide, are separately and continuously pumped under pressure from storage vessels through supply lines 13 and 14 respectively, by means of proportionating pumps 11 and 12, to a mixing chamber 15 in which they are intimately mixed. The mixture of aqueous ammonia and alkylene oxide is then fed into a reactor coil 16. In the examples described below the coil used was a stainless steel coil 75 feet in length (when extended), with an external diameter of 0.25 inch and internal diameter of 0.154 inch. The reactor coil 16 is mounted in a vessel 17 and is completely immersed in vigorously boiling liquid 18, the vapour escaping from the surface of the liquid passing to a condenser 19, in which it is cooled and condensed, and then returned to the body of the liquid in the vessel 17. The liquid 18 is caused to boil vigorously by a heating fluid passing through a coil 21 in reboiler 20.

After passing through the reactor within the desired reaction time (which is governed by the pumping rate) the products are led through a needle let-down valve 22 which is adjusted to maintain the desired pressure within the reactor coil 16 and then into a distillation column 23, provided with a reboiler 24. Excess ammonia is distilled off in the column 23 and is led off by pipe 25. The aqueous alkanolamines are collected and pass through pipe 26 to storage or for further treatment. The water may be removed from the aqueous alkanolamines by distillation and the alkanolamines then separated from one another by fractional distillation under reduced pressure.

The invention may also be carried out as described above with part or all of the water of the aqueous ammonia solution replaced by a suitable organic hydroxylic solvent. The pressure applied to the reaction mixture must be such as will maintain the mixture in the liquid phase throughout the reaction zone. In view of the rise in temperature which takes place it is desirable to use a considerable excess of pressure and generally speaking pressures in excess of 60 atmospheres should be used.

The following examples, in all of which the procedure set out in the method of carrying out the invention described above with reference to Fig. 2 was used, illustrate the invention. In these examples the alkylene oxide was fully reacted, no free alkylene oxide being found in the reaction products.

EXAMPLES 1 TO 15

In Examples 1 to 12 a mixture of an aqueous solution of ammonia and ethylene oxide was fed to the reactor. In Examples 13, 14, and 15 an aqueous solution of ammonia and propylene oxide was fed to the reactor.

Details of the examples are set out in the following table in which:

Column A gives the percent by weight of ammonia in the aqueous solution of ammonia.
Column B gives the molar ratio of ammonia to alkylene oxide in the mixture fed to the reactor.
Column C gives the pressure applied to the system in atmospheres gauge pressure.
Column D gives the temperature in °C. of the boiling liquid in which the reactor is immersed.
Column E gives the contact time within the reactor in seconds.
Column F gives the composition in percentages by weight of the alkanolamines in the product after the removal of excess ammonia and water. In Examples 1 to 12 the alkanolamines produced are the mono-, di-, and tri-ethanolamines and in Examples 13, 14, and 15 they are the mono-, di-, and tri-isopropanolamines.

*Table*

| Ex. No. | (A) | (B) | (C) | (D) | (E) | (F) Mono-alkanola-mine | (F) Dialka-nola-mine | (F) Trialka-nola-mine |
|---|---|---|---|---|---|---|---|---|
| 1 | 25 | 7.5 | 70–90 | 100 | 300 | 68 | 24 | 8 |
| 2 | 35 | 25 | 70–90 | 100 | 300 | 78 | 16 | 6 |
| 3 | 25 | 4 | 70–90 | 100 | 300 | 49 | 38 | 13 |
| 4 | 25 | 1 | 70–100 | 100 | 38 | 18 | 24 | 58 |
| 5 | 10 | 0.4 | 70–100 | 100 | 282 | 3.3 | 12.6 | [1] 79.2 |
| 6 | 60 | 7 | 60–80 | 100 | 126 | 50 | 33 | 17 |
| 7 | 60 | 7 | 60–80 | 135 | 126 | 58 | 31 | 11 |
| 8 | 80 | 8.5 | 60–80 | 100 | 400 | 59 | 29 | 12 |
| 9 | 80 | 8.5 | 60–80 | 140 | 120 | 72 | 22 | 6 |
| 10 | 95 | 9 | 60–80 | 100 | 1,200 | 60 | 31 | 9 |
| 11 | 95 | 9 | 60–80 | 149 | 92 | 69 | 25 | 6 |
| 12 | 98 | 9.6 | 60–80 | 100 | 7,200 | 61 | 30 | 9 |
| 13 | 25 | 10 | 60–80 | 100 | 45 | 74.5 | 24.5 | 1 |
| 14 | 25 | 1 | 60–80 | 100 | 60 | 20 | 44 | 36 |
| 15 | 60 | 2.5 | 60–80 | 100 | 180 | 37.5 | 50 | 12.5 |

[1] In Example 5 the product after removal of excess ammonia and water also contained 4.9% of higher ethers.

EXAMPLE 16

The ammoniacal aqueous product (i. e. the product containing unreacted ammonia and water) from Example 4 was cooled to 30° C. and continuously mixed with ethylene oxide in such proportions that the overall molar ratio of ammonia (i. e. reacted plus unreacted ammonia) to ethylene oxide (i. e. reacted plus fresh ethylene oxide) was brought to 1 to 2.5. This mixture was continuously passed through the reactor under the same reaction conditions as were used in Example 4.

The final product consisted of:

|  | Percent by weight |
|---|---|
| Ammonia | 1.5 |
| Water | 28.3 |
| Commercial triethanolamine | 70.0 |

This "Commercial triethanolamine" was found on fractional distillation to contain:

| | Percent by weight |
|---|---|
| Monoethanolamine | 4.6 |
| Diethanolamine | 6.8 |
| Triethanolamine | 80.7 |
| Higher ethers | 7.9 |

EXAMPLE 17

The ammoniacal aqueous solution of isopropanolamines obtained as the product in Example 14 before distillation, was mixed in equal parts by volume with propylene oxide, bringing the overall molar ratio of propylene oxide to ammonia to 3.0 to 1.0, and the mixture passed through the reactor, which was surrounded by boiling water. A contact time of 90 seconds and an applied pressure of 60–80 atmospheres was used.

The resulting crude triisopropanolamine, after removing excess ammonia and water had the following composition:

| | Percent by weight |
|---|---|
| Monoisopropanolamine | Not found |
| Diisopropanolamine | 3.0 |
| Triisopropanolamine | 93.1 |
| Triisopropanolamine ether | 3.9 |

EXAMPLE 18

A solution of ammonia in methanol containing 60% by weight of ammonia was mixed with ethylene oxide to give a mixture in which the molar ratio of ammonia to ethylene oxide was 7:1, and this mixture was passed through the reactor surrounded by a liquid boiling at 127° C. A pressure of 120–160 atmospheres was applied to the system and the contact time in the reactor was 120 seconds.

After removal of excess ammonia and methanol the resulting amines contained.

| | Percent by weight |
|---|---|
| Monoethanolamine | 63 |
| Diethanolamine | 30 |
| Triethanolamine | 7 |

EXAMPLE 19

A solution of ammonia in water and methanol containing 60% by weight of ammonia, 20% by weight of methanol and 20% by weight of water was mixed with ethylene oxide to give a mixture in which the molar ratio of ammonia to ethylene oxide was 7:1. The mixture was passed through the reactor surrounded by a liquid boiling at 109° C. A pressure of 120 to 160 atmospheres was applied to the system and the contact time was 120 seconds.

The resulting amines, after removal of the water, methanol and excess ammonia, had a composition similar to that of the amines obtained in Example 1.

EXAMPLE 20

A 50% solution by weight of ammonia in n-butanol was reacted with ethylene oxide in the reactor coil in a molar ratio of ammonia to ethylene oxide of 6.8:1. The reactor coil was immersed in a bath of liquid boiling at 127° C. and the pressure applied to the system was 120–160 atmospheres. A contact time of 132 seconds resulted in complete reaction of the ethylene oxide.

Excess ammonia and butanol were removed from the product and the resulting mixture of amines had a composition approximating closely to that of the amines obtained in Example 1.

EXAMPLE 21

The monoethanolamine contained in the product of Example 3 above was recovered by fractional distillation under reduced pressure. 500 parts by volume of the recovered monoethanolamine, 125 parts by volume of water and 60 parts by volume of ethylene oxide were intimately mixed and the mixture fed to the reactor coil described above under a pressure of 40–60 atmospheres, the bath temperature being 100° C. The contact time within the reactor was 100 seconds. After removal of water and excess monoethanolamine the product had the following composition:

| | Percent by weight |
|---|---|
| Diethanolamine | 89 |
| Triethanolamine | 11 |

We claim:

1. A process for the production of alkanolamines, primarily monoalkanolamines, which comprises continuously passing a mixture of an alkylene oxide containing 2–3 carbon atoms in the molecule and aqueous ammonia containing from 4–15 mols of ammonia per mol of said alkylene oxide and from 20–60% by weight of water under superatmospheric pressure of at least 60 atmospheres which maintains the mixture in a liquid state through a reaction zone initially heated to at least 80° C., and maintained within the temperature range of about 80–200° C., for a period of time of about 30–1800 seconds whereby the reaction of the alkylene oxide with ammonia is substantially complete.

2. A process as defined in claim 1, in which the aqueous ammonia contains from about 4–10 mols of ammonia for every molecule of said alkylene oxide and the reaction zone is initially heated to 100–150° C. and the contact time does not exceed about 400 seconds.

3. A process as defined in claim 1, in which the alkylene oxide is ethylene oxide.

4. A process for the production of ethanolamines by the reaction of ammonia with ethylene oxide, which comprises continuously passing a mixture of an aqueous ammonia, containing about 60% by weight of ammonia, and ethylene oxide, said mixture containing about 7 molecules of ammonia per molecule of ethylene oxide, under a pressure of 60 to 100 atmospheres through a reaction zone heated to from 100–160° C. for a contact time within the reaction zone of about 30 seconds.

References Cited in the file of this patent

UNITED STATES PATENTS

| 2,337,004 | Schwoegler | Dec. 14, 1943 |
| 2,373,199 | Schwoegler et al. | Apr. 10, 1945 |
| 2,622,073 | Ferrero et al. | Dec. 16, 1952 |
| 2,622,099 | Ferrero et al. | Dec. 16, 1952 |